US006317532B1

(12) United States Patent
Lin et al.

(10) Patent No.: US 6,317,532 B1
(45) Date of Patent: Nov. 13, 2001

(54) METHOD AND APPARATUS FOR LOW LOSS VIA GEOMETRICAL OPTIMIZATION IN FREE-SPACE MICRO-MACHINED OPTICAL SWITCHES

(75) Inventors: Lih Yuan Lin, Middletown; Evan Lee Goldstein, Princeton; Robert William Tkach, Little Silver, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/429,786

(22) Filed: Oct. 29, 1999

Related U.S. Application Data
(60) Provisional application No. 60/112,278, filed on Dec. 15, 1998, and provisional application No. 60/112,271, filed on Dec. 15, 1998.

(51) Int. Cl.[7] .................................................. G02B 6/26
(52) U.S. Cl. ................... 385/18; 385/15; 385/16
(58) Field of Search .................. 385/15–23, 31, 385/147, 9

(56) References Cited

U.S. PATENT DOCUMENTS

| 5,208,880 | * | 5/1993 | Riza et al. ............................ 385/18 |
| 5,933,478 | | 8/1999 | Ozaki et al. . |
| 5,960,132 | | 9/1999 | Lin . |

OTHER PUBLICATIONS

L.Y.Lin, E.L. Goldstein, J.M. Simmons, R.W. Tkach "High–Density Micromachined Polygon Optical Crossconnects Exploiting Network Connection–Symmetry" IEEE Photonics Technology Letters, vol. 10, No. 10, Oct. 1998, pp. 1425–1427.

L.Y. Lin, E.L. Goldstein, R.W. Tkach "Free–Space Micromachined Optical Switches with Submillisecond Switching Time for Large–Scale Optical Crossconnects" IEEE Photonics Technology Letters, vol. 10, No. 4, Apr. 1998, pp. 525–527.

* cited by examiner

*Primary Examiner*—James Phan
(74) *Attorney, Agent, or Firm*—Kenyon & Kenyon (57) ABSTRACT

A method and apparatus for minimizing optical loss associated with light beam divergence in a free-space micro-machined optical switch is presented. The coupling efficiency of a free-space micro-machined optical switch, that is, how efficiently the switch transfers an optical light beam from an emitting optical fiber to a receiving optical fiber, is obtained by calculating the overlap integral of the wave functions of an optical beam taken in a free-space mode at an entry point in the switch and in a fiber mode at a receiving fiber facet of the optical switch. Since the optical light beam diverges as it propagates through the optical switch, and the propagation distance increases with mirror size, that coupling efficiency is limited by the ratio of the optical light beam radius and the mirror radius of the switch. Thus, through careful measurements it becomes clear that an optimal value, for a given switch, of the ratio of the size of the beam in relation to the size of the mirror of the optical switch can be determined to optimize coupling efficiency and minimize data loss.

16 Claims, 9 Drawing Sheets

METHOD AND APPARATUS FOR LOW LOSS VIA GEOMETRICAL OPTIMIZATION IN FREE-SPACE MICRO-MACHINED OPTICAL SWITCHES

PRIOR PROVISIONAL PATENT APPLICATION

The present application claims the benefit of U.S. Provisional Application No. 60/112,278 filed Dec.15, 1998.

CROSS REFERENCE TO RELATED APPLICATIONS

The present application is related to the following U.S. patent applications: U.S. patent application Ser. No. 5,960,132 filed Dec. 31, 1997, and U.S. Provisional Application No. 60/112,271 filed Dec. 15, 1998, both of which are hereby incorporated by reference.

BACKGROUND OF THE INVENTION

1. Field of the Invention

The present invention relates to a method and apparatus for reducing coupling loss via a geometrical optimization in free-space micro-machined optical switches, and more particularly, to a method and apparatus for reducing data loss caused by light beam divergence and the associated differences between the radius of an optical light beam and the radius of a mirror of a free-space micro-machined optical switch.

2. Description of the Art

Due to very rapid increases in core-transport network demand (e.g., in the bit rates of individual services and in the number of wavelength channels being built into Wavelength Division Multiplexing (WDM) transport systems), fiber-optic switches with large port-count have quickly emerged as perhaps the most important, yet unrealized, technological need in future high-capacity light-wave networks. These fiber-optic network elements will be chiefly used for network restoration to begin with, with substantial provisioning value likely emerging thereafter.

The optical switching technologies advanced so far offer the potential advantages of bit-rate transparency, low power consumption, small volume, and low cost. Nevertheless, the requirements in port count (on the order of 512×512) and in loss budget represent deep challenges that have not yet been met by any current photonic switching technology. Although conventional mechanical switches can achieve high optical quality, they are large in size and mass, and are thus relatively slow in switching speed. On the other hand, guided-wave solid-state switches, though compact, generally have high loss and high crosstalk. The inherent disadvantages of these technologies thus appear to limit their expandability to the port counts mentioned above.

By contrast, free-space micro-machined optical-switching technology holds particular appeal in this application because it combines the advantages of free-space interconnection (i.e., low loss and high optical quality) with those of monolithic integrated optics, namely, compactness. Various small-scale (2×2) micro-machined switches utilizing sliding micro-mirrors have been demonstrated. In addition, collimating optics and rotating micro-mirrors have also been proposed as a means of achieving high-density optical switches. Given the fertility that the field of micro-optical systems is beginning to show, and the considerable variety of switching devices that has already emerged, it is likely that diverse applications will be best suited to diverse switching technologies. However, for the application of restoration and provisioning in core-transport light-wave networks, free-space micro-machined optical switches (FS-MOS) with free-rotating hinged micro-mirrors are particularly attractive. Attractive because such applications do not require frequent switching, but do require very high reliability even for switch mirrors that remain in one switching state for extended periods on the order of years. Furthermore, the sub-millisecond switching times exhibited by FS-MOS devices are well-matched to the needs of restoration and provisioning in core-transport light-wave communications networks.

However, like other optical cross-connect technologies, free-space micro-machined optical switches face the substantial challenge of achieving increased port-count while living within a specified loss budget that will in practice be fixed by adjacent transponders. Studies of scaling and loss in these devices have thus far been purely empirical, and thus neither the fundamental limits nor the means of approaching them are understood.

SUMMARY OF THE INVENTION

Accordingly, the present invention provides the theoretically and experimentally investigated fundamental loss mechanisms in free-space micro-machined optical cross-connects showing the existence of geometrical loss minima. The physical investigation of the geometrical loss minima focuses on measuring insertion loss of a 16×16 free-space micro-machined optical cross-connect having a switch-mirror radius of 150 $\mu$m. The investigation reveals that even in the face of diffraction, mirror-aperturing and mirror-curvature, an insertion loss of only 2.9 dB can be achieved.

Theory then suggests that by exploiting these geometric loss minima it is possible to achieve 1024-port (512×512) multistage switches with only 6 dB of loss. This would make possible the sort of large-scale cross-connects that appear to be needed in core WDM network applications.

The present invention, including its features and advantages, will become more apparent from the following detailed description with reference to the accompanying drawings.

DETAILED DESCRIPTION

FIGS. 1 through 9 illustrate a method and apparatus for determining the geometrical coupling loss minima for free-space micro-machined optical switches.

Figure 1:
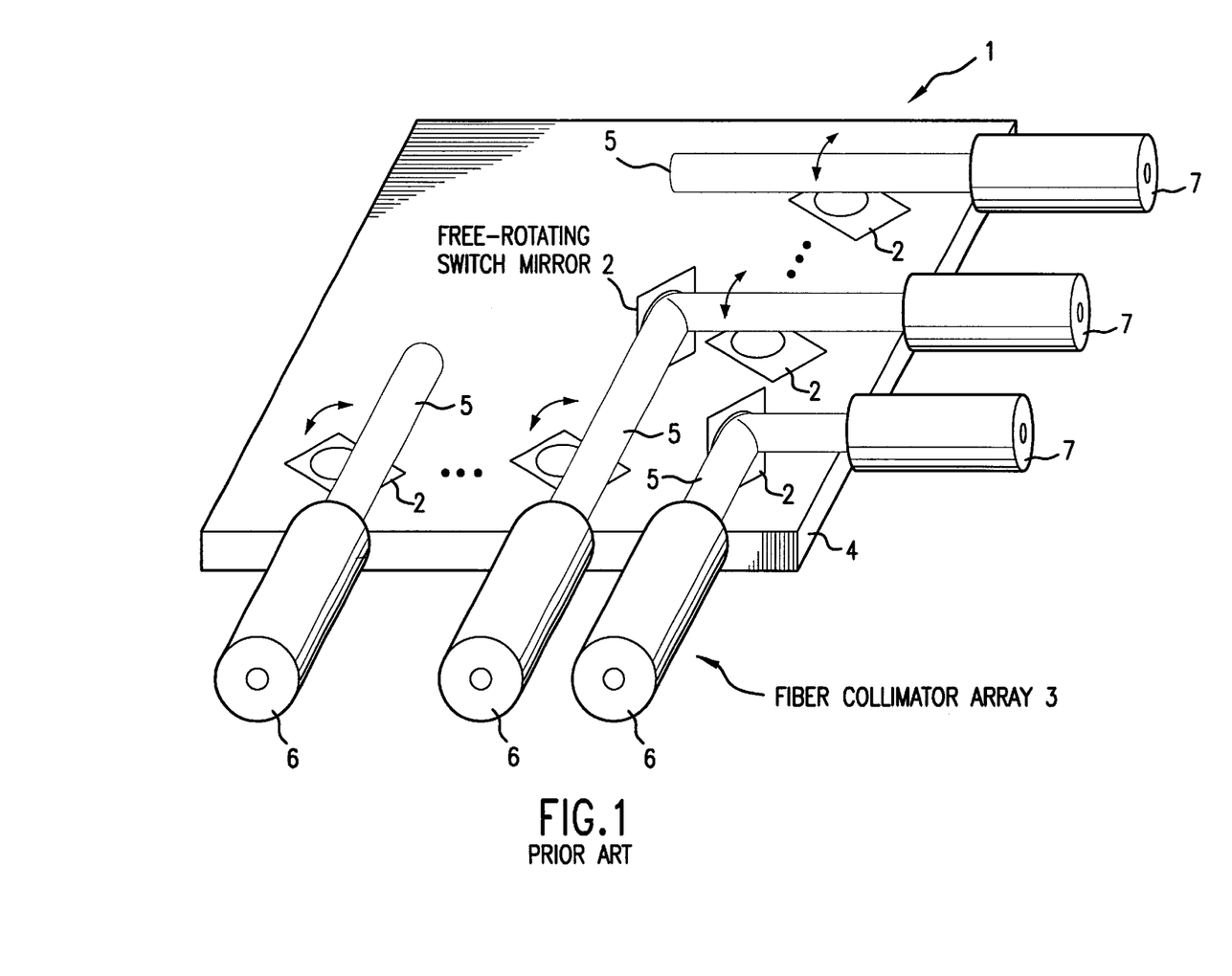
FIG. 1 illustrates a matrix schematic of a free-space micro-machined optical switch, according to the prior art.

Referring to FIG. 1, the working principle of a matrix making up a free-space micro-machined optical switch (FS-MOS) 1 is shown. The FS-MOS 1 is constructed of a number of free-rotating mirrors 2 positioned at each intersecting point beyond an end of a number of laterally placed optical fibers (or ports) comprising a fiber collimator array 3. The micro-actuated free-rotating mirrors 2 themselves are monolithically integrated on a silicon chip 4 by means of well-known surface micro-machining fabrication techniques. The fiber collimator array 3 carries a collimated light beam 5 which is emitted from an emitting optical fiber (input port) 6 and received by a receiving optical fiber (output port) 7. The collimated light beam 5 is switched from an input port 6 to the desired output port 7 by rotating a selected mirror 2. In this manner then, a light beam 5 can be directed from an input port 6 to any output port 7. It is to be understood, of course, that the FS-MOS 1 may thus be of any size. That is, the FS-MOS can have any number of input and output ports and corresponding mirrors at the intersecting junctures there between. Indeed, FS-MOS devices of 1024 ports (512×512) are contemplated.

Figure 2:
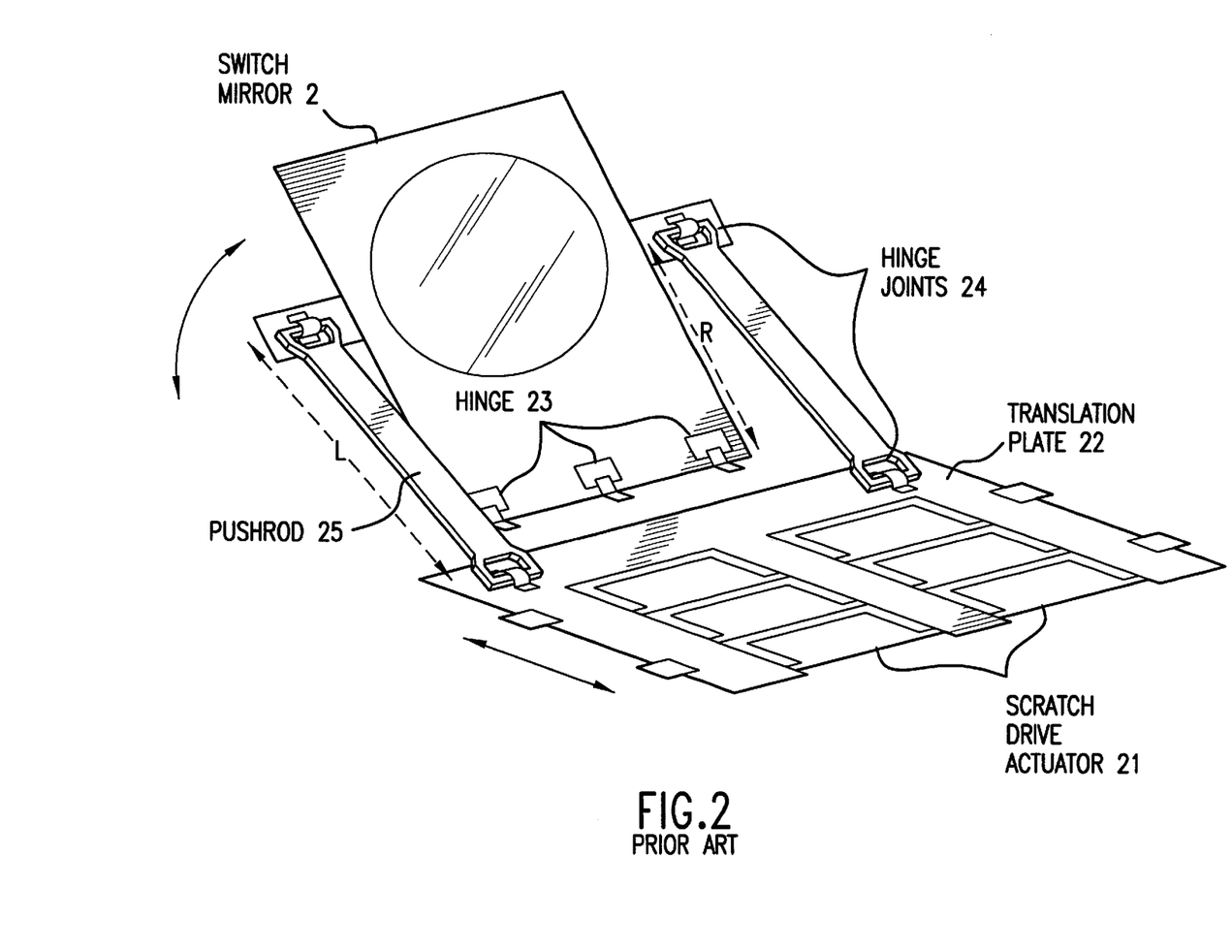
FIG. 2 illustrates a micro-actuated free-rotating hinged switch mirror, according to the prior art, utilized in the matrix schematic of the free-space micro-machined optical switch of FIG. 1.

Referring now to FIG. 2, a schematic drawing of a switch mirror 2 in an actuated state is shown. The mirror 2 is actuated by the back and forth movement of an array of scratch drive actuators 21, embedded in a translation plate 22, towards and away from the mirror 2. Rotatable actuation of the mirror occurs as the translation plate 22 is connected to the mirror 2 by a pair of push rods 25 through a number of modified interleaved hinges constituting hinge joints 24. Further, the mirror 2 is anchored to the silicon chip substrate 4 at the end closest to the actuators 21 by a number of micro-fabricated hinges 23. Thus, when the actuators 21, embedded in the translation plate 22, move towards and away from the mirror 2, the mirror 2 rises and falls accordingly. In this manner then, the design efficiently translates the movement of the micro-actuators to a rotation of the mirror.

Figure 3:
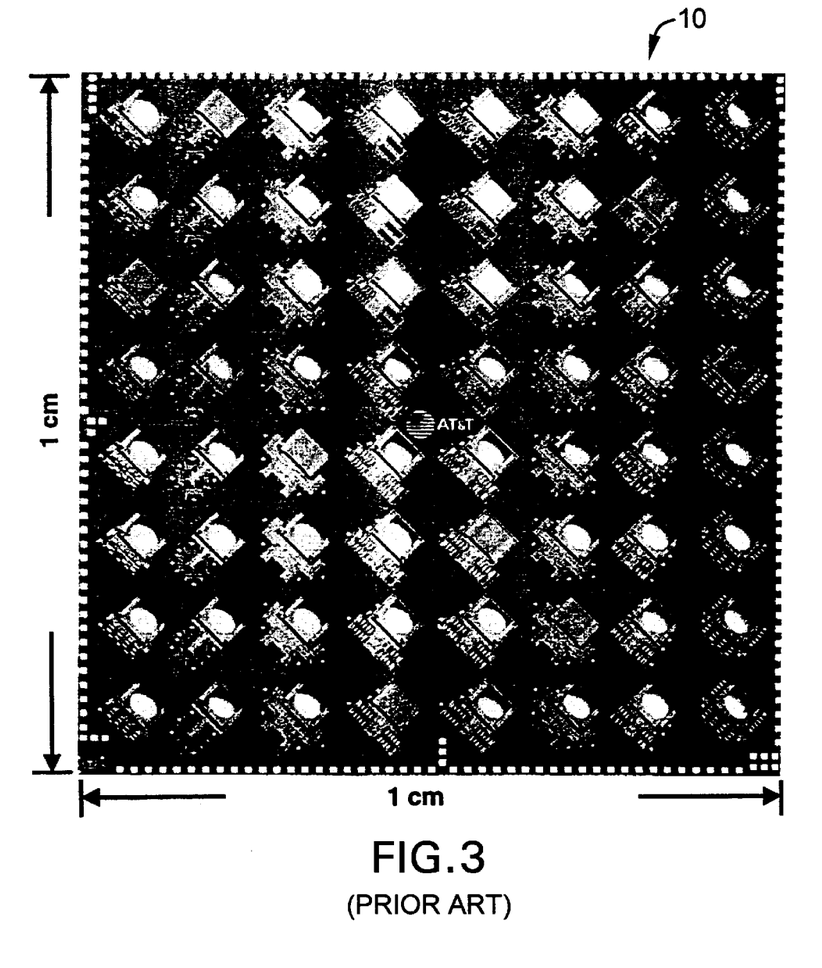
FIG. 3 illustrates a top view of an 8×8 free-space micro-machined optical switch, according to the prior art.

Referring now to FIG. 3, a top-view photograph of an 8×8 free-space micro-machined optical switch 10 is shown. The whole switch matrix occupies a chip area of only 1×1 cm². FS-MOS chips utilizing mirrors of the above-described structure have been fabricated using well known Multi-User MEMS fabrication Processes (MUMPs). Such fabrication can take the form of: epitaxial layers consisting of one $Si_3N_4$ layer for insulation; three polysilicon layers, one for ground-plane purposes (poly-0) and two for mechanical structures (poly-1 and poly-2); two phosphosilicate glass layers for use as sacrificial material; and one gold layer for use in fabricating electrical contacts and mirror coatings. The mirror 2 and the translation plate 22 are built on the second polysilicon (poly-1) layer and anchored to the silicon substrate 4 through hinges 23 and guiding rail structures (not shown) built on the third polysilicon layer (poly-2). The scratch drive actuators 21 are L-shaped polysilicon plates formed on poly-2. The hinge joints 23 consist of interleaved poly-1/poly-2 structures and are connected to the pushrods 25 built on poly-2. After the epitaxial growth, the sacrificial material is selectively etched by immersing the device in hydrofluoric acid, thus releasing the mechanical structures from the silicon substrate 4.

Figure 4:
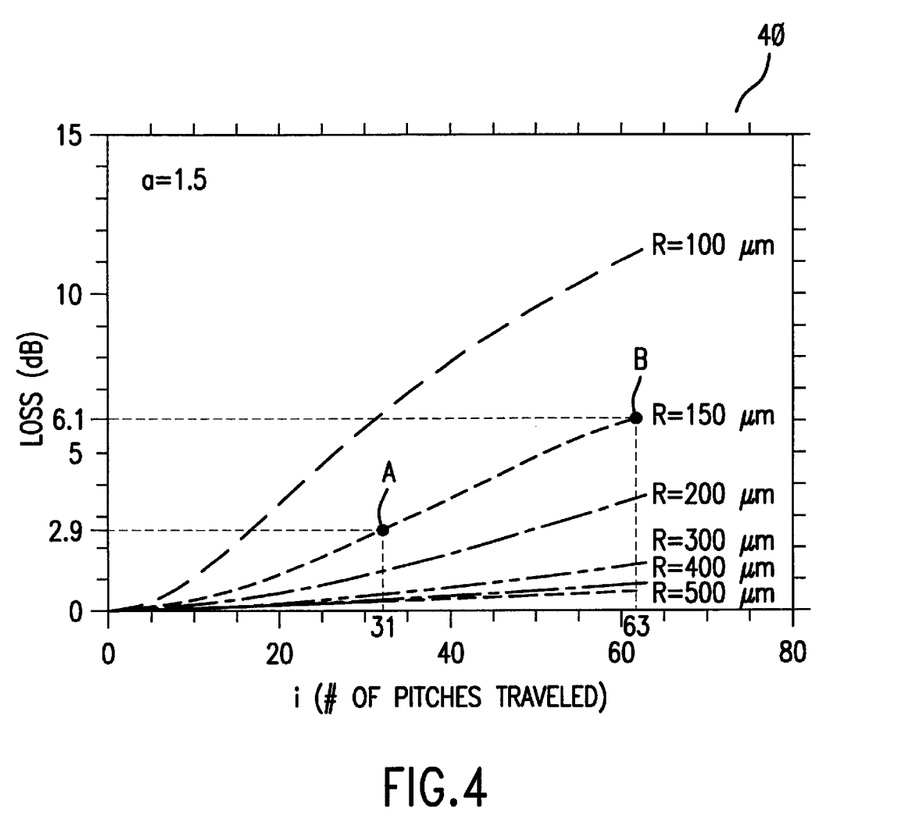
FIG. 4 illustrates a plot graph of the calculated coupling loss versus the number of mirror pitches traversed through a free-space micro-machined cross-connect having a normalized mirror radius of a=1.5 (where a is the ratio of the mirror radius R to the radius of the Gaussian beam waist), according to an embodiment of the present invention.

Referring now to FIG. 4, a plot graph 40 of the calculated coupling loss (represented in dB along the vertical axis) versus the number of mirror pitches traversed i (represented along the horizontal axis) through a free-space micro-machined optical switch having a normalized mirror radius a=1.5 is shown. The normalized mirror radius a is a dimensionless variable that is determined by dividing the switch mirror radius R by the input Gaussian light beam's 1/e half-beam waist $w_0$ (which occurs at the emitting fiber-collimator's facet). The resulting equation to determine the normalized mirror radius is $a=R/w_0$. Thus when a=1.5, the mirror is 1.5 times as large as the beam waist. The number of mirror pitches traversed i represents the total propagation distance the optical beam travels through the switch (i.e., the number of rows plus columns). Therefore, when the number of mirror pitches traversed i=31, this corresponds to the longest propagation path in a 16×16 switch.

Coupling efficiency is computed from the overlap integral of the light beam's wave function in free-space after emission from the emitting fiber with the light beam's wave function at the receiving fiber (i.e., a determination of how much of the original light beam's wave function is retained). The functions are necessarily different, and thus coupling efficiency decreases, as the optical light beam diverges as it propagates through the free-space of the switch (the narrowest portion of the beam, what is known as the waist of the beam, is finite). For the sake of simplicity, the effect of angular misalignments through the switch matrix on the coupling efficiency are neglected. Further, as it is an inherent feature of these switch devices that larger mirrors imply longer propagation paths, the devices described herein have a mirror pitch p that is geometrically related to mirror radius by p=3R+800 μm.

Thus, utilizing a 16×16 cross-connect built up from four basic 8×8 switch units, coupling loss is seen to rise rapidly as both the mirror and/or beam size decrease. This suggests that beam divergence is the dominant factor in this region. The effect, however, saturates for mirror radii of R>400 μm. Regarding a switch mirror radius of R=150 μm for example, fiber-to-fiber losses of 2.9 dB were measured through the longest path of the 16×16 switch, which is plotted at point A as the propagation of the light beam across 31 mirror pitches. For comparison, fiber-to-fiber losses of 6.1 dB were determined for a simulated 32×32 switch, which is plotted at point B by increasing the light beam propagation path length to 63 traversed mirror pitches. In order to reduce loss associated with beam divergence one can increase the beam half-waist $w_0$ while keeping the mirror radius R unchanged, thus reducing the normalized mirror radius a.

Figure 5:
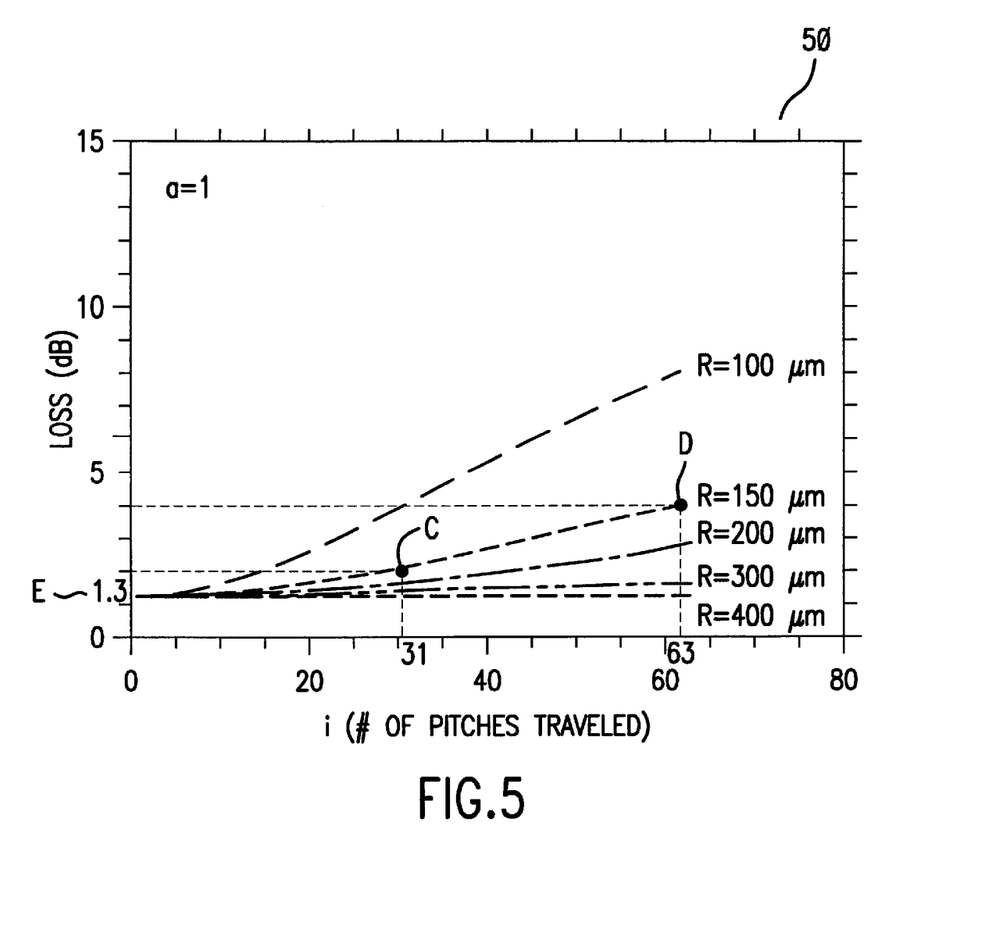
FIG. 5 illustrates a plot graph of the calculated coupling loss versus the number of mirror pitches traversed through a free-space micro-machined cross-connect having a normalized mirror radius of a=1 (where a is the ratio of the mirror radius R to the radius of the Gaussian beam waist), according to an embodiment of the present invention.

Referring now to FIG. 5, a result of reducing the normalized mirror radius a to 1 is plotted (i.e. $R=w_0$) and shown by plot graph 50. Again regarding a switch mirror radius of R=150 μm for example, fiber-to-fiber losses of 1.9 dB were calculated through the longest path of the 16×16 switch, which is plotted at point C as the propagation of the light beam across 31 mirror pitches. Also again for comparison, fiber-to-fiber losses of 4.0 dB were determined for a simulated 32×32 switch, which is plotted at point D by increasing the light beam propagation path length to 63 traversed mirror pitches. The coupling loss suffered by switches with small mirrors is greatly reduced by this tactic, as is evident by comparison with FIG. 4. However, since the optical light beam is no longer completely captured by the reflecting mirror, a loss floor of 1.3 dB appears as shown by plot line E. Further, while it is true that Gaussian beams with larger beam waists (i.e., diameters) do exhibit smaller divergence angles, the mirror size that would be required correspondingly increases with that beam diameter, thus making using larger beams and the corresponding larger mirrors impractical for the size of the core-networks contemplated.

Since a large normalized mirror radius a enhances diffraction as shown in FIG. 4, while a small normalized mirror radius a induces aperturing losses as shown in FIG. 5, one expects to find optimal values of a. These indeed exist, as is clear from the plots of the longest-path coupling loss for a 32×32 cross-connect (i.e., i=63), as shown in plot graph 60 in FIG. 6, and a 45×45 cross-connect (i.e., i=89), as shown in plot graph 70 in FIG. 7. For example, referring to FIG. 6, the optimal value of a for a switch mirror with a radius of R=150 μm determined for the longest propagation path in the 32×32 cross-connect is 0.98 with a loss of 4.1 dB as shown by plot point F, while, referring now to FIG. 7, the optimal value of a for a switch mirror with a radius of R=150 μm determined for the longest propagation path in the 45×45 cross-connect is 0.89 with a loss of 5.7 dB as shown by plot point G. As the mirror radius R increases in each case, the optimal value of a increases as well. This is because the effects of beam divergence are most severe for small-waisted light beams. For example, referring back to FIG. 6, the optimal value of a for a switch mirror with a radius of R=300 μm determined for the longest propagation path in the 32×32 cross-connect is 1.3 with a loss of 1.2 dB as shown by plot H, while, referring back again to FIG. 7, the optimal value of a for a switch mirror with a radius of R=300 μm determined for the longest propagation path in the 45×45 cross-connect is 1.2 with a loss of 1.9 dB as shown by plot point I.

Utilizing the above-demonstrated geometrical optimization analysis, the minimum coupling loss for the large 512×512 and 1024×1024 switch matrixes that will be needed in core long-haul networks can be determined. To accomplish the analysis of these large switch matrixes, a three-stage Clos switch-fabric architecture using smaller constituent switch modules as a means of constructing the large port-count switch is utilized. Assuming the input port count of each switch module in the first of the three stages is n, in order to achieve the property of strict non-blocking, the output port count of the switch module needs to be greater than 2n−1. This is also the required input and output port count for the switch module in the second of the three stages. The switch module in the third stage is a mirror image of that in the first stage. Therefore, to construct a 512×512 switch fabric, one can employ 32 layers, with 16×32, 32×32, and 32×16 switch modules comprising the three stages. Likewise, to construct a 1024×1024 switch fabric, 45 layers of 23×45, 45×45, and 45×23 switch modules may be used.

Figure 6:
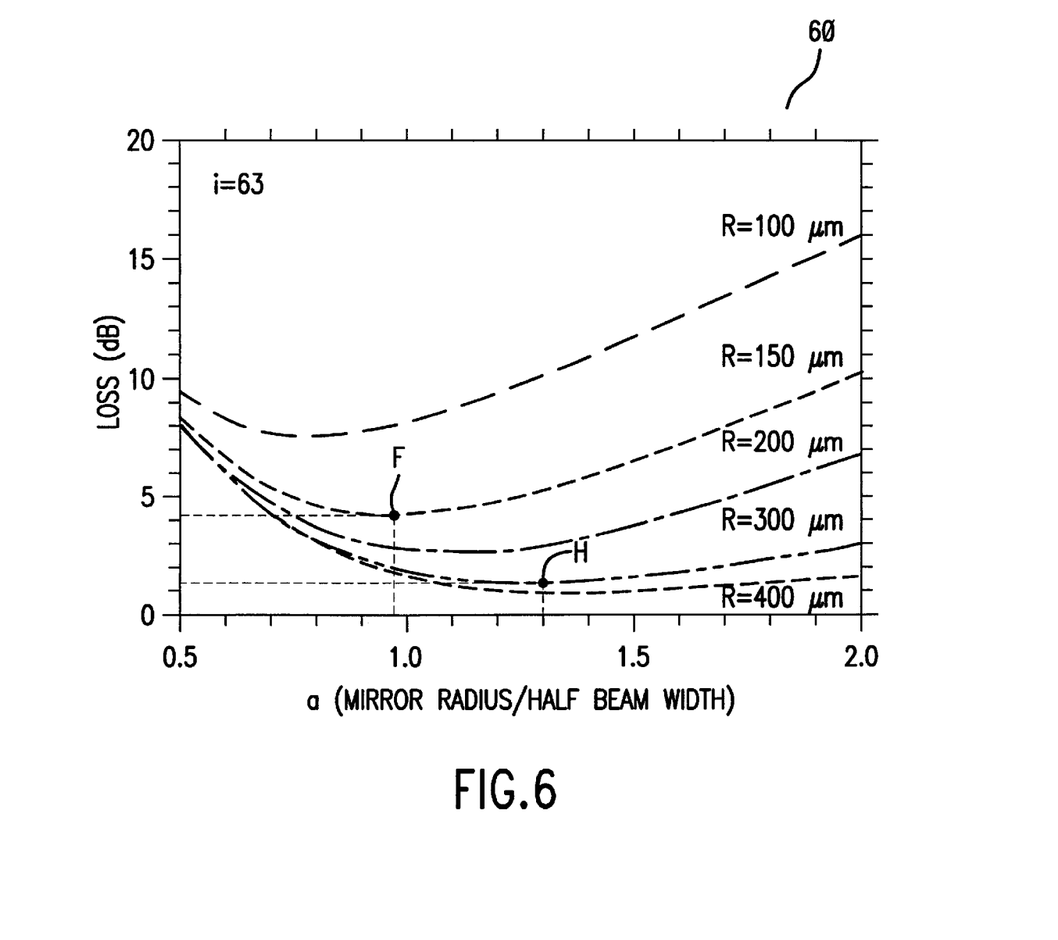
FIG. 6 illustrates a plot graph of the highest coupling loss for a 32×32 free-space micro-machined optical switch versus a for various mirror radii R, according to an embodiment of the present invention.
Figure 7:
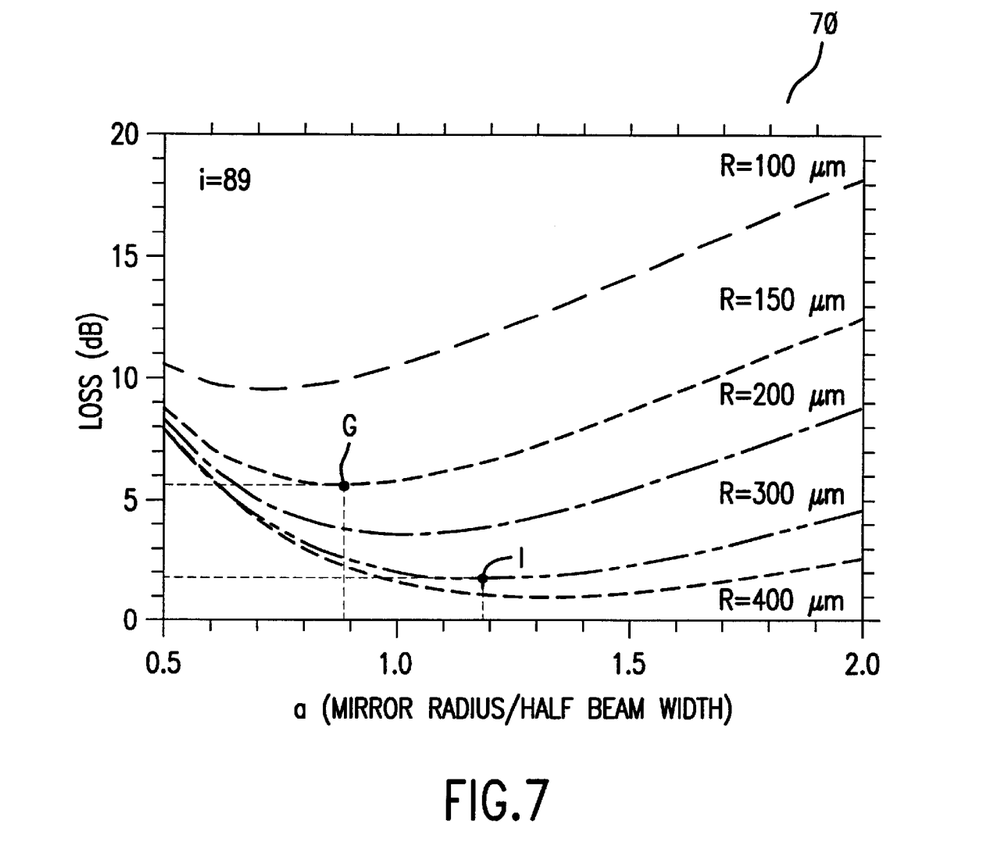
FIG. 7 illustrates a plot graph of the highest coupling loss for a 45×45 free-space micro-machined optical switch versus a for various mirror radii R, according to an embodiment of the present invention.
Figure 8:
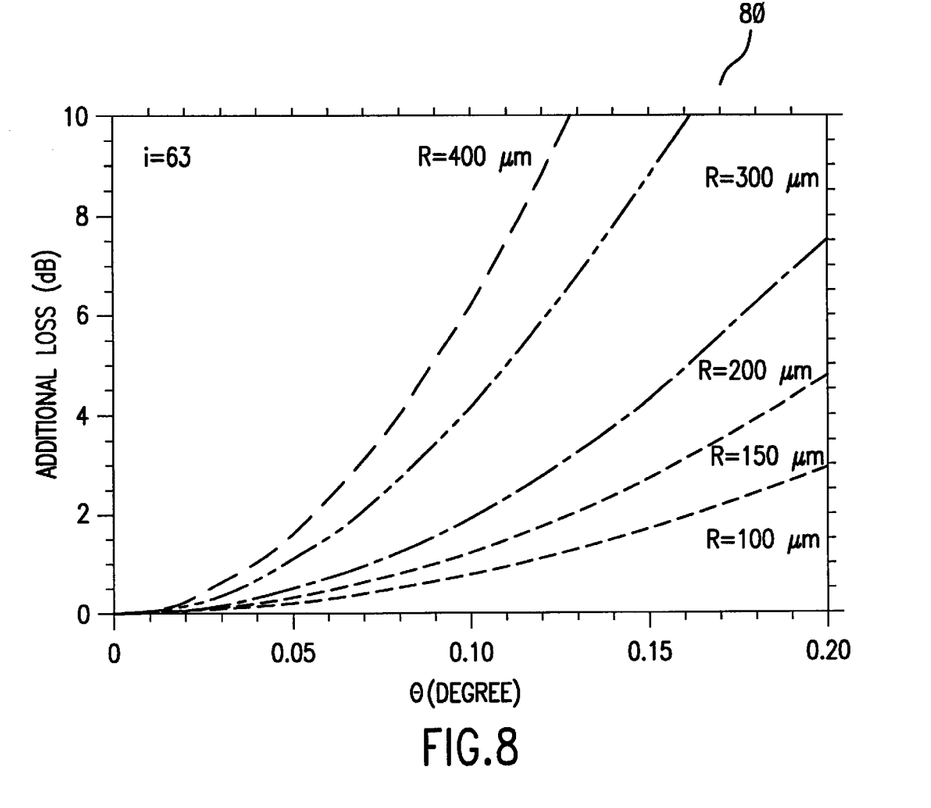
FIG. 8 illustrates a plot graph of additional coupling loss for a 32×32 free-space micro-machined optical switch (in which a has been optimized individually for different mirror radii R) due to mirror-angle variation θ (measured in degrees), according to an embodiment of the present invention.

With this construction, a 512×512 three-stage switch with a mirror radius of 200 μm would consume only 5.8 dB of coupling loss through the longest propagation path of the switch matrix. Similarly, a 1024×1024 three-stage switch with a mirror radius of 250 μm would likewise consume only 5.8 dB of coupling loss through the longest propagation path of the switch matrix. In each of these cases, the switch's second stage imposes loss values as indicated in FIGS. 6 and 7, respectively, while the first and third stages impose smaller losses due to their smaller size. These coupling loss values are well within practical system limits. Thus, the geometrical optimization technique of the present invention allows large-scale optical cross-connects with low coupling losses.

The results described above, of course, assume a perfectly aligned optical system. To characterize imperfectly aligned systems, the dependence of coupling efficiency on the angular error in mirror alignment may be captured by performing a coordinate-system transformation on the wave function of the propagating Gaussian beam. Thus, referring to plot graph 80 in FIG. 8, the additional loss (measured in dB) versus mirror-angle variation (measured in degrees) for various mirror radii, assuming that the traversed number of pitches is fixed at i=63, is shown. The value of a has been optimized individually for different mirror radii R. The system's sensitivity to angular misalignment is seen to decrease rapidly as the optical beam size decreases. For example, for a mirror radius of R=150 μm, the misalignment penalty can be held to values <3 dB if the mirror-angle variation is held smaller than 0.16°.

Further, all of the results shown so far assume that the system is configured so that the input beam waists reside at the facets of the input fiber collimators. In practice, however, various modifications can be made to the fiber collimators so as to reduce the coupling loss suffered by the system due to beam divergence. For example, the focal length of the input fiber collimators can be designed such that the minimum Gaussian-beam waist is located at the facet of the receiving fiber. The coupling efficiency will then be optimized for certain input/output fiber pairs. Thus, referring to plot graph 90 in FIG. 9, coupling loss (measured in dB) versus the light beam propagation traveling pitch distance for various mirror radii R, assuming that the input fiber collimators are of the focusing variety, is shown. The values of a have again been optimized individually. The fiber collimators are optimized for the longest achievable focal length within the diffraction limit $$\left( i \cdot p(R) \le \frac{\pi \pi_0^2}{2\lambda} \right).$$

Figure 9:
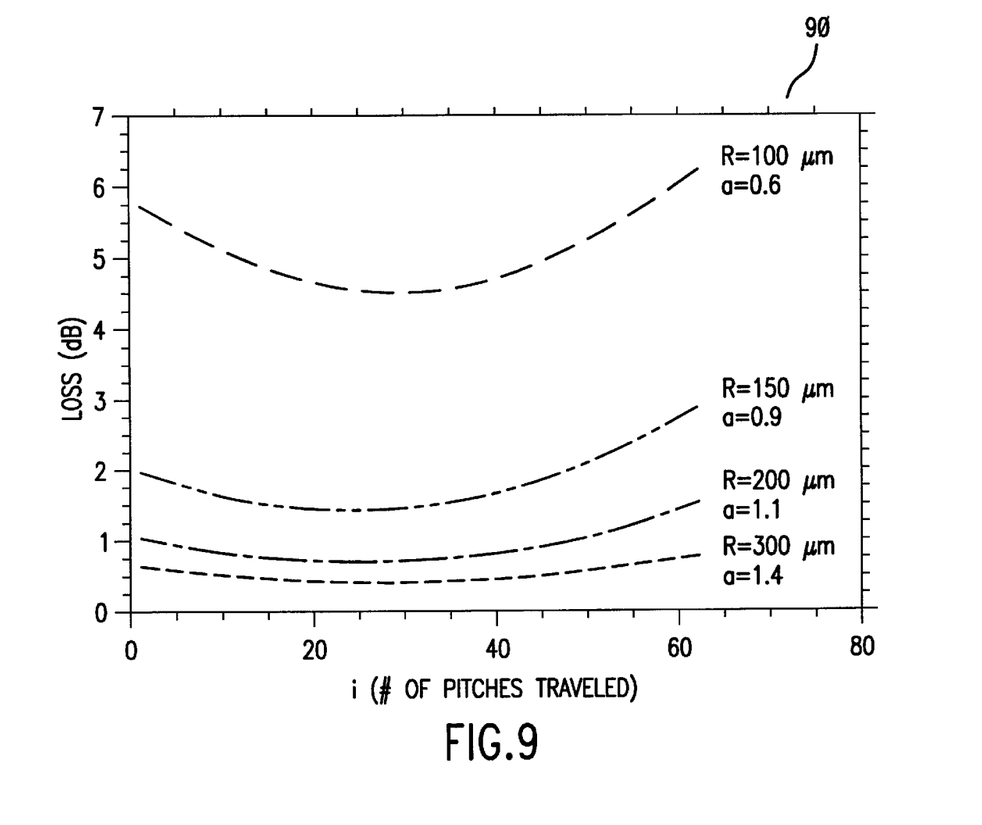
FIG. 9 illustrates a plot graph of coupling loss for a 32×32 free-space micro-machined optical switch (in which a has been optimized individually for different mirror radii R) versus the number of mirror pitches traversed, according to an embodiment of the present invention.

By comparing FIG. 9 with FIG. 6, it is seen that the maximum coupling loss through the switch matrix can be substantially reduced by exploiting this approach.

Thus, as can be seen from the above, the present invention provides a technique to minimize coupling loss so that cross-connect matrixes can be realized on the order of 512×512 and 1024×1024 for use in large-scale data networks. Such low loss is well within transponder budgets.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. The specification and the drawings are accordingly to be regarded in an illustrative rather than in a restrictive sense.

What is claimed is:

1. An apparatus that limits coupling loss due to divergence of a light beam, having a half-beam waist $w_0$, traveling a path of i mirror pitches in a free-space micro-machined optical switch, the apparatus comprising:

an emitting fiber-optic cable which emits the light beam in a first direction of the path;

a receiving fiber-optic cable which receives the light beam from a second direction of the path; and a free-rotating mirror, having a mirror radius of R, positioned such that it is juxtaposed at a point at an end of each of the emitting and receiving fiber-optic cables and can thus reflect the path of the light beam from the first direction to the second direction, wherein a value of the mirror radius R is such that when divided by the half-beam waist $w_0$ of the light beam it provides an optimum value of a normalized mirror radius a at which point there is a minimum coupling loss for the path of i mirror pitches the light beam travels.

2. The apparatus according to claim 1, wherein an individual mirror pitch in the path the light beam travels is three times the mirror radius R plus 800 μm.

3. The apparatus according to claim 1, wherein the minimum coupling loss is a value $\leq 6$ dB.

4. The apparatus according to claim 3, wherein the path the light beam travels is through a longest propagation path of the free-space micro-machined optical switch.

5. The apparatus according to claim 1, wherein the free-space micro-machined optical switch comprises one of a 512×512 and a 1024×1024 switch matrix.

6. The apparatus according to claim 1, wherein an angle misalignment of the free-rotating mirror can be compensated for by performing a coordinate-system transformation on a wave function of the light beam.

7. The apparatus according to claim 1, wherein the emitting fiber-optic cable can focus the light beam.

8. A method of limiting coupling loss due to divergence of a light beam traveling in a free-space micro-machined optical switch, the method comprising the steps of:

determining a number of mirror pitches to be traveled by the light beam; and determining an optimal value of a normalized mirror radius at which point there is a minimum of coupling loss for the determined number of mirror pitches to be traveled by the light beam.

9. The method according to claim 8, wherein the step of determining an optimal value of a normalized mirror radius further comprises the steps of:

measuring a radius of a free-rotating switch mirror in the free-space micro-machined optical switch;

determining a half-beam waist of the light beam; and dividing the measured radius of the free-rotating switch mirror by the determined half-beam waist of the light beam.

10. The method according to claim 8, wherein the step of determining an optimal value of a normalized mirror radius further comprises the step of:

adjusting one of a radius of a free-rotating switch mirror and a half-beam waist of the light beam.

11. The method according to claim 8, wherein the number of pitches to be traveled is a longest propagation path through the free-space micro-machined optical switch.

12. The method according to claim 8, wherein an individual mirror pitch in a path the light beam travels is three times a mirror radius plus 800 μm.

13. The method according to claim 8, wherein the minimum coupling loss is $\leq 6$ dB.

14. The method according to claim 8, wherein the free-space micro-machined optical switch comprises one of a 512×512 and a 1024×1024 switch matrix.

15. The method according to claim 8, further comprising the step of:

determining an additional coupling loss due to an angle misalignment of the free-rotating mirror; and compensating for the angle misalignment.

16. The method according to claim 15, wherein the determination of the additional coupling loss is accomplished by performing a coordinate-system transformation on a wave function of the light beam.

* * * * *